United States Patent [19]

Ishii et al.

[11] Patent Number: 5,070,234
[45] Date of Patent: Dec. 3, 1991

[54] CONNECTING DEVICE FOR IC CARD

[75] Inventors: Noriyuki Ishii; Masayasu Hirano; Hideo Kajita; Hirokazu Kuroda; Shuji Izumi; Akihiko Fujino; Toshihiko Ishimura; Reiji Seki, all of Osaka, Japan

[73] Assignee: Minolta Camera Kabushiki Kaisha, Osaka, Japan

[21] Appl. No.: 352,187

[22] Filed: May 15, 1989

[30] Foreign Application Priority Data

May 16, 1988 [JP] Japan ................................ 63-118633

[51] Int. Cl.⁵ .............................................. G06K 7/06
[52] U.S. Cl. ..................................... 235/441; 235/492; 235/375; 354/412
[58] Field of Search ....................... 235/441, 492, 375; 354/412

[56] References Cited

U.S. PATENT DOCUMENTS

| | | |
|---|---|---|
| 4,286,849 | 9/1981 | Uchidoi et al. . |
| 4,443,077 | 4/1984 | Tanikawa . |
| 4,477,164 | 10/1984 | Nakai et al. . |
| 4,500,183 | 2/1985 | Tanikawa . |
| 4,537,487 | 8/1985 | Taniguchi et al. . |
| 4,573,786 | 3/1986 | Taniguchi et al. . |
| 4,673,275 | 6/1987 | Nakai et al. . |
| 4,675,516 | 6/1987 | Guion ............................ 235/492 X |
| 4,699,491 | 10/1987 | Ishimura . |
| 4,724,453 | 2/1988 | Hamano . |
| 4,728,978 | 3/1988 | Inoue et al. . |
| 4,733,258 | 3/1988 | Kojima . |
| 4,733,265 | 3/1988 | Haraguchi et al. . |
| 4,767,918 | 8/1988 | Kushima et al. ............... 235/492 X |
| 4,782,355 | 11/1988 | Sakai et al. . |

FOREIGN PATENT DOCUMENTS

| | | |
|---|---|---|
| 58-126521 | 7/1983 | Japan . |
| 58-133124 | 8/1983 | Japan . |
| 59-46085 | 3/1984 | Japan . |
| 60-15885 | 1/1985 | Japan . |
| 60-22794 | 2/1985 | Japan . |
| 60-209989 | 10/1985 | Japan . |
| 60-209990 | 10/1985 | Japan . |
| 62-2383 | 1/1987 | Japan . |
| 62-2702 | 1/1987 | Japan . |
| 62-76370 | 4/1987 | Japan . |
| 62-99044 | 6/1987 | Japan . |
| 62-134779 | 6/1987 | Japan . |

Primary Examiner—David Trafton
Attorney, Agent, or Firm—Burns, Doane, Swecker & Mathis

[57] ABSTRACT

A connecting device for establishing electric connection between an electronic appliance and an IC card loaded in position in the electronic appliance, which can prevent possible operation in error and breakdown of a component circuit of the IC card when the IC card is loaded into the electronic appliance. The device includes several terminals provided on the IC card, corresponding terminals provided on the electronic appliance, and a pair of switch terminals located on the electronic appliance for contact with the IC card. The terminals of the IC card and/or the electronic appliance are arranged such that, upon loading of the IC card, at first supply of power to the IC card from the electronic appliance and resetting of the IC card may take place. Signals of the switch terminals which are operated at a last stage eby the IC card are applied to cause activation of the electronic appliance and initialization of the IC card.

5 Claims, 9 Drawing Sheets

FIG. 5a
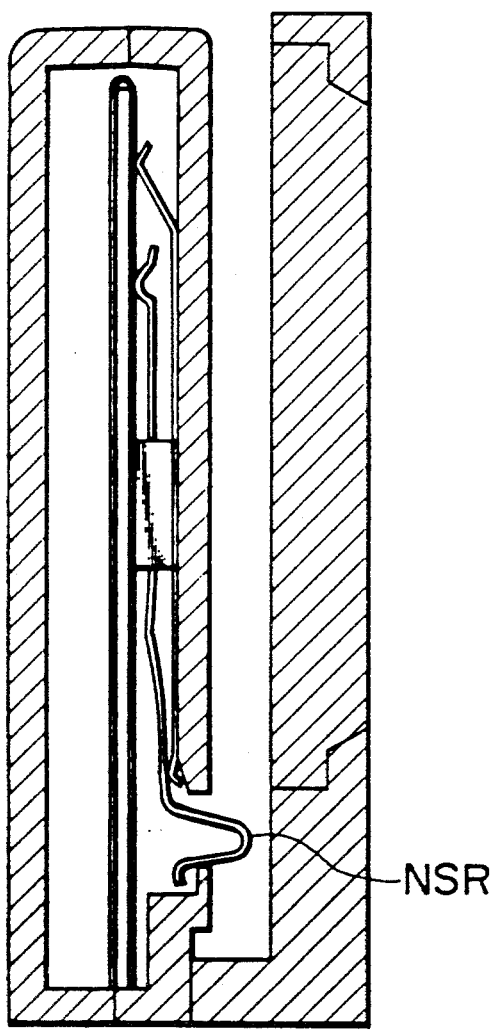
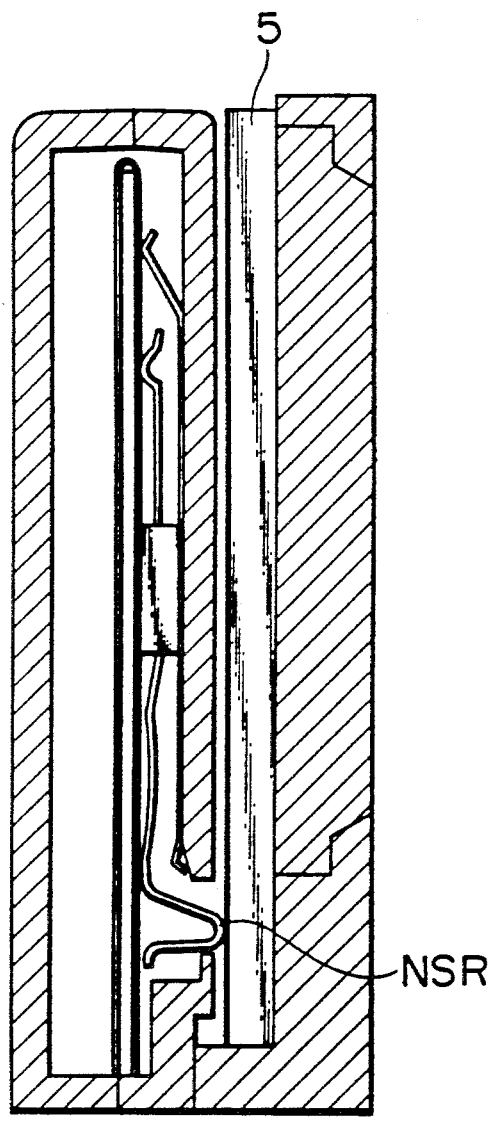
FIG. 5b

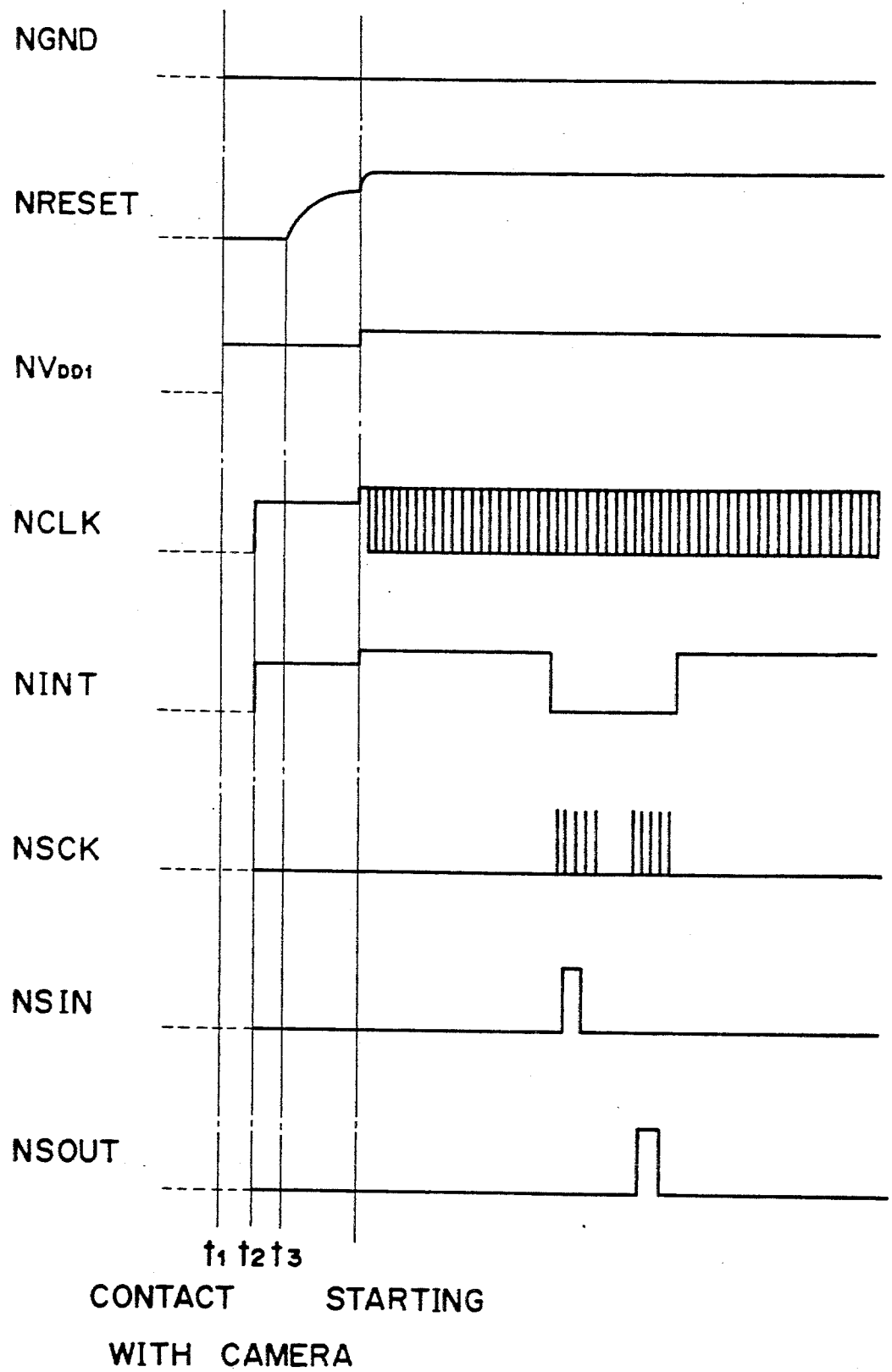

5,070,234

CONNECTING DEVICE FOR IC CARD

BACKGROUND OF THE INVENTION

1. Field of the Invention

This invention relates to a connecting device for establishing electric connection between an electronic appliance and an IC (integrated circuit) card loaded in position in the electronic appliance.

2. Description of the Prior Art

An IC card is normally supplied with electric power from an electronic appliance in which it is loaded by way of connecting terminals of the IC card and the electronic appliance to execute a predetermined operation. With such IC card, there is the possibility that, depending upon a timing at which a power source terminal and a signal terminal thereof are connected to corresponding terminals of the electronic appliance, a component circuit of the IC card such as a CPU (central processing unit) may suffer from latch-up, operation in error or breakdown.

SUMMARY OF THE INVENTION

It is an object of the present invention to provide a connecting device for establishing electric connection between an electronic appliance and an IC card loaded in position in the electronic appliance, which can prevent possible operation in error and breakdown of a component circuit of the IC card when the IC card is loaded into the electronic appliance.

In order to attain the object, according to the present invention, there is provided a connecting device for establishing electric connection between an electronic appliance and an IC card loaded in position in the electronic appliance, which comprises a positive power source terminal, a negative power source terminal, a signal terminal and a reset terminal all located on the IC card, another positive power source terminal, another negative power source terminal, another signal terminal and another reset terminal all located on the electronic appliance for connection with the positive power source terminal, negative power source terminal, signal terminal and reset terminal on the IC card, respectively, and first and second switch terminals located on the electronic appliance for contact with the IC card other than the terminals for producing, in response to loading of the IC card in position into the electronic appliance, a signal for canceling a reset condition of the IC card and a signal for activating the electronic appliance, respectively. The terminals of the IC card and/or the electronic appliance are arranged such that, when the IC card is loaded in position into the electronic appliance, at first the negative power source terminal, reset terminal and positive power source terminal of the IC card are brought into contact with the corresponding terminals of the electronic appliance, and then the signal terminal of the IC card is brought into contact with the signal terminal of the electronic appliance, whereafter the first and second switch terminals of the electronic appliance are contacted by the IC card.

With the connecting device, when an IC card is loaded in position into the electronic appliance, at first the negative power source terminal, reset terminal and positive power source terminal of the IC card are brought into contact with the corresponding terminals of the electronic appliance. Accordingly, upon loading of the IC card, at first supply of power to the IC card from the electronic appliance and resetting of the IC card take place. Consequently, such a trouble is prevented that a component circuit of the IC card may operate in error or may be damaged or broken.

The above and other objects, features and advantages of the present invention will become apparent from the following description and the appended claims, taken in conjunction with the accompanying drawings.

BRIEF DESCRIPTION OF THE DRAWINGS

FIG. 5a is a sectional view showing other terminals of the camera of FIG. 3 before loading of the IC card of FIG. 2 into the camera;

FIG. 5b is a sectional view corresponding to FIG. 5a with the IC card loaded into the camera;

FIGS. 6 and 7 are timing charts illustrating different operations of the circuit shown in FIG. 1;

DETAILED DESCRIPTION OF THE PREFERRED EMBODIMENTS

Figure 1:
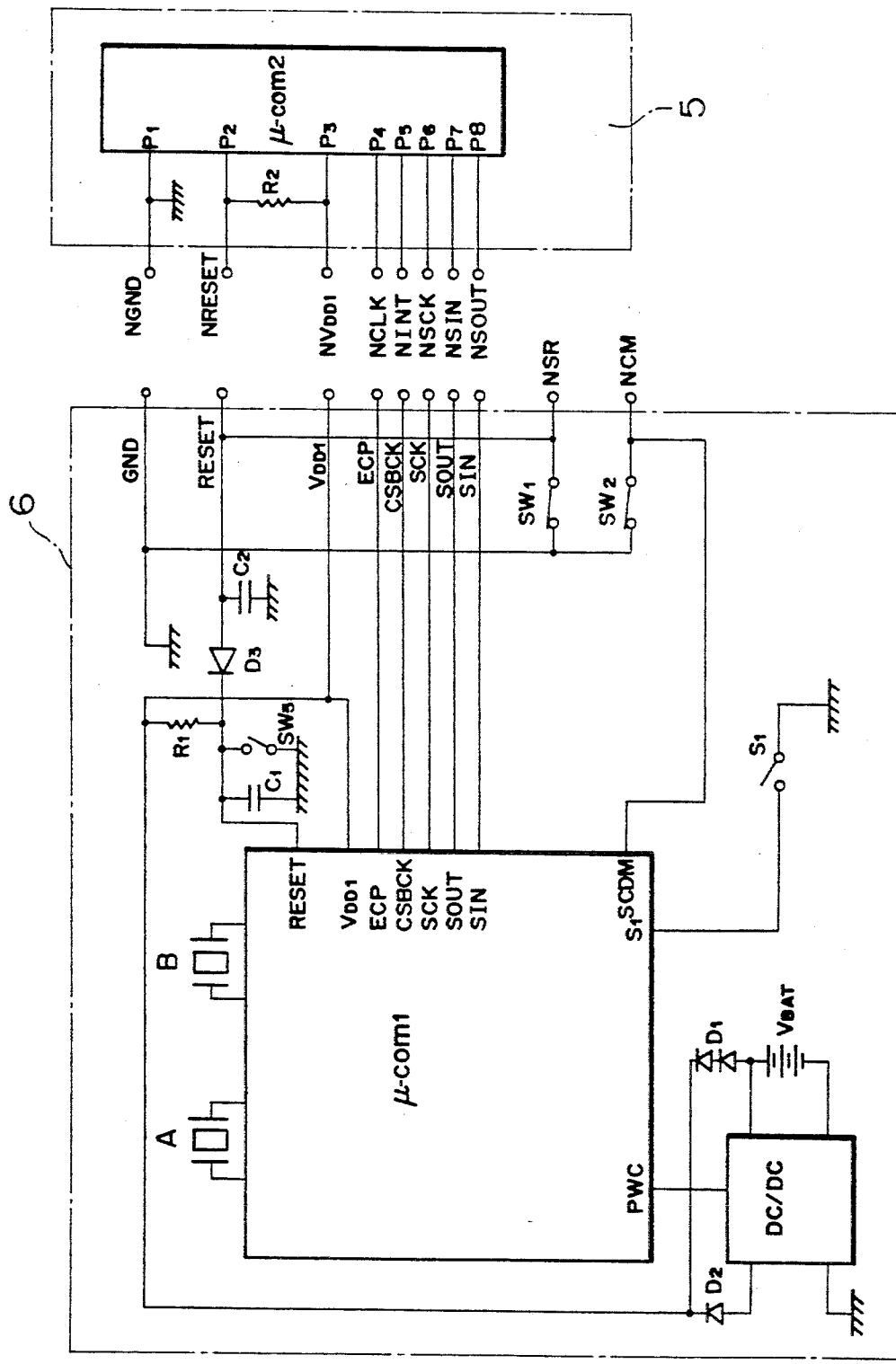
FIG. 1 is a circuit diagram of an entire circuit of a connecting device showing a preferred embodiment of the present invention.

Referring first to FIG. 1, there is shown an entire circuit of a connecting device to which the present invention is applied. In FIG. 1, an IC card is generally denoted at 5 while an electric circuit of an electronic appliance into which the IC card 5 may be loaded is generally denoted at 6. Here, the electronic appliance is in the form of a camera, and the electric circuit 6 of the camera includes a microcomputer (hereinafter referred to as camera side microcomputer) $\mu$-com1 which executes sequencing control and exposure control of the camera and communication of data from and to an IC card 5 loaded in position in the camera. The camera side microcomputer $\mu$-com1 is connected to receive two different voltage supplies including a voltage $V_{BAT}$ to be supplied from a power source battery by way of a diode $D_1$ and another voltage $V_{DD1}$ to be supplied from the battery by way of a DC/DC converter DC/DC and another diode $D_2$. Here, the voltage $V_{DD1}$ is higher than the voltage $V_{BAT}$. The camera side microcomputer $\mu$-com1 is supplied with clocks from a lower frequency oscillator A and a higher frequency oscillator B. The lower frequency oscillator A operates with the lower supply voltage $V_{BAT}$ while the higher frequency oscillator B operates with the higher supply voltage $V_{DD1}$ but cannot operate with the lower supply voltage $V_{BAT}$.

The camera circuit 6 includes a light measuring switch S1 which is turned on when a shutter button (not shown) of the camera is depressed to cause activation of the camera side microcomputer $\mu$-com1 and starting of light measuring operation of the camera. The camera circuit 6 further includes a pair of switches SW1 and SW2 which are switched from an on-state to an off-state in response to loading of an IC card 5 into the camera, and a further switch SW3 which is also switched from an on-state to an off-state upon such loading of the battery. On-off signals of the switches S1, SW2 and SW3 are received at input ports S1, SCDM and RESET, respectively, of the camera side microcomputer μ-com1 while an on-off signal of the switch SW1 is received also at the input port RESET of the camera side microcomputer μ-com1 but by way of a diode $D_3$.

Figure 2:
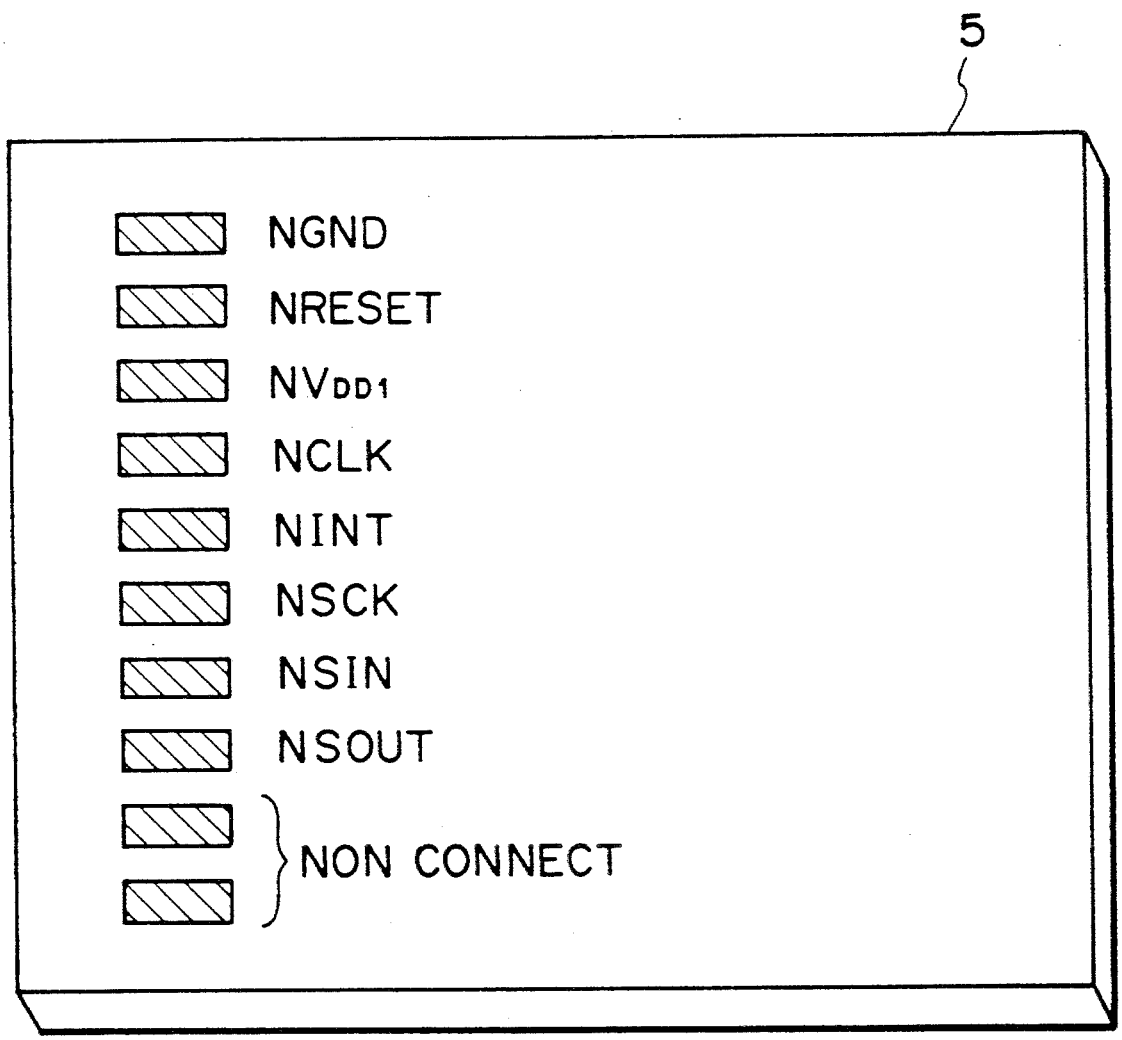
FIG. 2 is a front elevational view of an IC card for use with the connecting device of FIG. 1.

The IC card 5 shown in FIG. 1 includes a card side microcomputer μ-com2 for communication with the camera side microcomputer μ-com1. Each of the IC card 5 and the camera has up to 8 terminals by means of which they may be electrically connected to each other in order to communicate data between them. In particular, referring also to FIGS. 2 and 3, the IC card 5 and the camera have negative power supply terminals GND and NGND, card side microcomputer resetting terminals RESET and NRESET, positive power source terminals $V_{DD1}$ and $NV_{DD1}$, system clock transmitting terminals ECP and NCLK to the IC card 5, communication starting signal transmitting terminals CSBCK and NINT, serial clock transmitting terminals SCK and NSCK, data transmitting terminals SOUT and NSIN from the camera to the IC card 5, and data communicating terminals SIN and NSOUT from the IC card 5 to the camera, respectively, all paired with each other. The camera has two additional switch terminals NSR and NCM which are pushed by an IC card 5 upon loading of the IC card 5 in position into the camera to switch the switches SW1 and SW2 from an on-state to an off-state while the IC card 5 has no corresponding electric terminals as seen in FIGS. 1 and 2. The camera side switch terminal NSR is connected to the camera side resetting terminal RESET and thus delivers an on/off signal of the switch SW1, that is, a reset canceling signal in response to loading of an IC card 5 into the camera.

Figure 3:
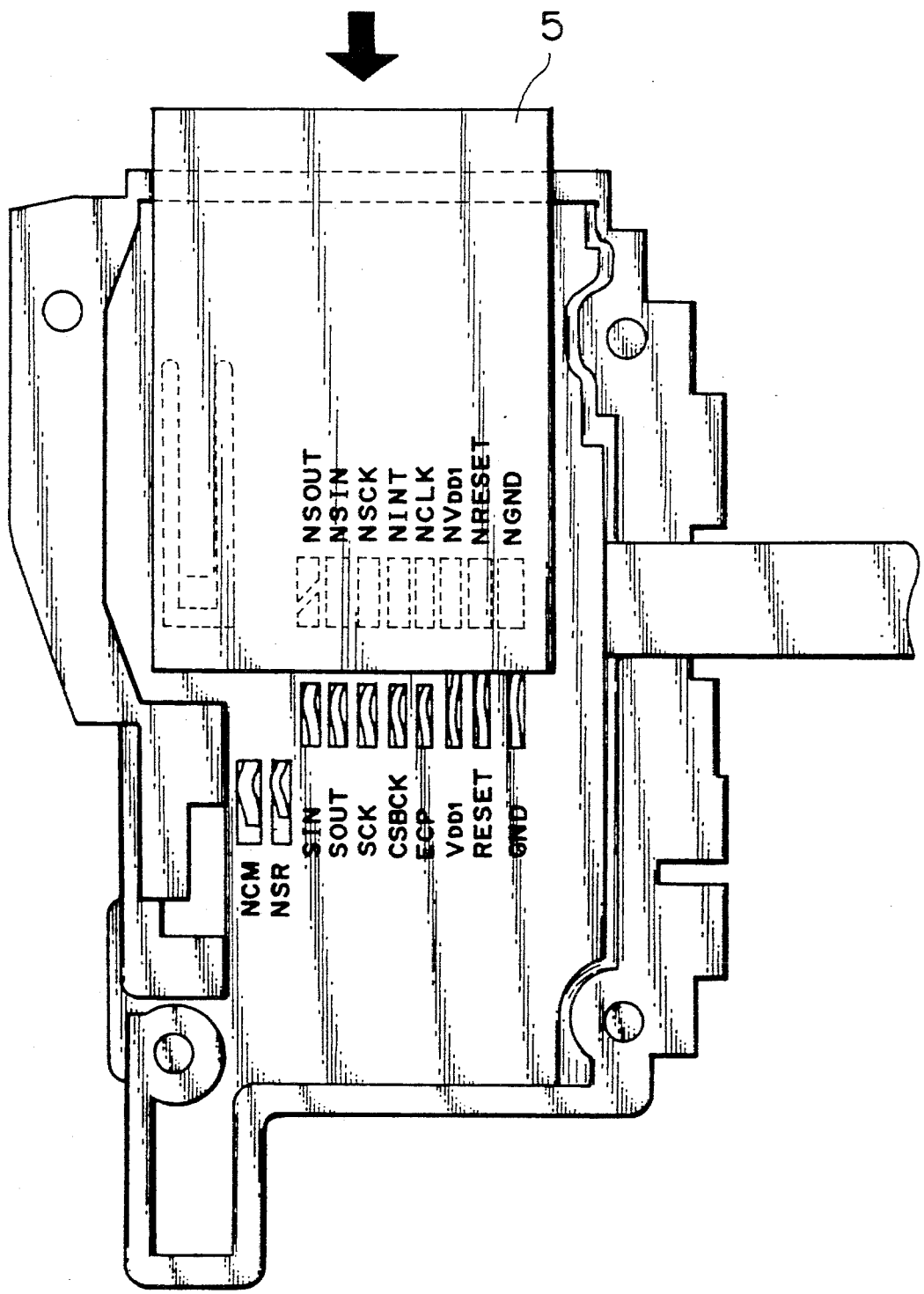
FIG. 3 is a schematic view illustrating a relationship between terminals of the IC card of FIG. 2 and terminals of a camera into which the IC card is to be loaded.

When an IC card 5 is to be loaded in position into the camera, it is inserted into a predetermined location of the camera from above as seen in FIG. 3. During such insertion, the terminals of the IC card 5 are successively brought into contact at different timings with the terminals of the camera. In particular, referring to FIG. 2, the terminals of the IC card 5 is arranged in a row perpendicular to an insertion direction of the IC card 5, that is, in the leftward direction in FIG. 2. Meanwhile, referring to FIG. 3, the terminals of the camera are divided into three sets including a first set of the terminals GND, RESET and $V_{DD1}$, a second set of the terminals ECP, CSBCK, SCK, SOUT and SIN, and a third set of the terminals NSR and NCM, and the three sets of the terminals are displaced by a small distance from each other in the insertion direction of the IC card 5, that is, in the vertical direction in FIG. 3. Consequently, when the IC card 5 is loaded into the camera, at first the paired terminals GND and NGND, RESET and NRESET, and $V_{DD1}$ and $NV_{DD1}$ are electrically connected to each other, and then the paired terminals ECP and NCLK, CSBCK and NINT, SCK and NSCK, SOUT and NSIN, and SIN and NSOUT are electrically connected to each other, whereafter the terminals NSR and NCM are contacted and operated by the IC card 5 to turn the switches SW1 and SW2 from an on-state to an off-state, respectively.

The circuit shown in FIG. 1 operates in different manners when the light measuring switch S1 is manually operated, when an IC card 5 is loaded in position into the camera and when a battery is exchanged. Such operations will be described below.

When the camera side microcomputer μ-com1 is in its stand-by condition, it receives the power supply voltage $V_{BAT}$ by way of the diode $D_1$ from a battery loaded in position in the camera, and the lower frequency oscillator A is operating while the higher frequency oscillator B is at rest. Accordingly, the camera side microcomputer μ-com1 repetitively executes port scanning, for example, for each 4 HZ of clocks provided by the lower frequency oscillator A in order to detect current states of the various switches of the camera. In this condition, if one of the various switches of the camera, for example, the light measuring switch S1, is turned on, then when the camera side microcomputer μ-com1 monitors the port S1 thereof, it detects that the switch S1 is now in an on-state and thus delivers a signal from a port PWC thereof to the DC/DC converter DC/DC. The DC/DC converter DC/DC receives the signal and supplies the higher power supply voltage $V_{DD1}$ to the camera side microcomputer μ-com1 by way of the diode $D_2$. Consequently, the camera side microcomputer μ-com1 starts its operation as a result of operation of the higher frequency oscillator B which operates with the higher power supply voltage $V_{DD1}$.

Meanwhile, when the camera side microcomputer μ-com1 is in its stand-by condition, it also monitors, at the port SCDM thereof, a current state of the switch SW2 for each 4 HZ with the lower frequency oscillator A. If no IC card is loaded in position into the camera, then the switch SW2 remains in an on-state and the card side microcomputer μ-com1 receives a low level voltage at the port SCDM thereof. Consequently, the camera side microcomputer μ-com1 remains in its stand-by condition.

If an IC card 5 is inserted in position into the camera, then the switch SW2 is turned off. The camera side microcomputer μ-com1 which monitors at the port SCDM thereof detects such turning off of the switch SW2 and delivers a signal from the port PWC thereof to the DC/DC converter DC/DC. The DC/DC converter DC/DC receives the signal and delivers the higher power supply voltage $V_{DD1}$ to the camera side microcomputer μ-com1 by way of the diode $D_2$. Consequently, the camera side microcomputer μ-com1 starts its operation as a result of operation of the higher frequency oscillator B.

Figure 4A:
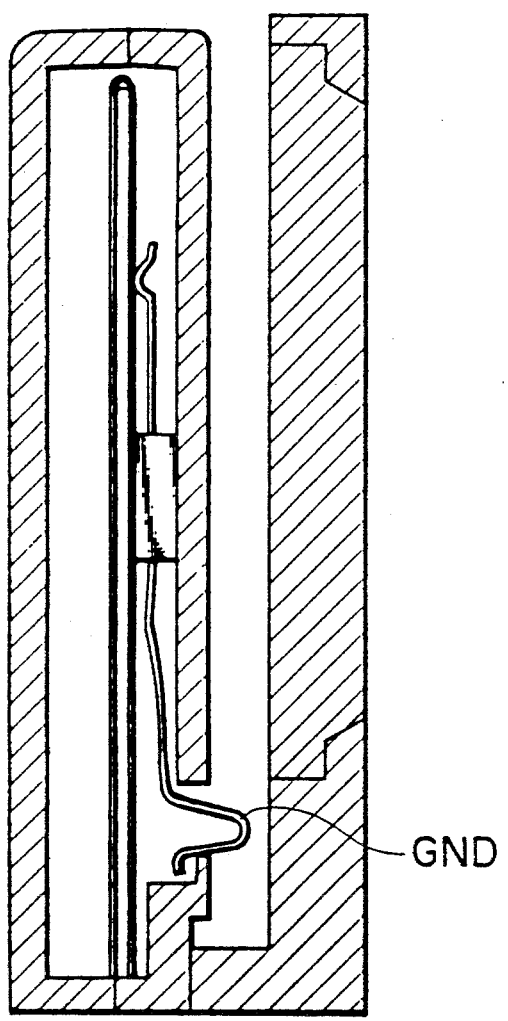
FIG. 4a is a sectional view showing terminals of the camera of FIG. 3 before loading of the IC card of FIG. 2 into the camera.
Figure 4B:
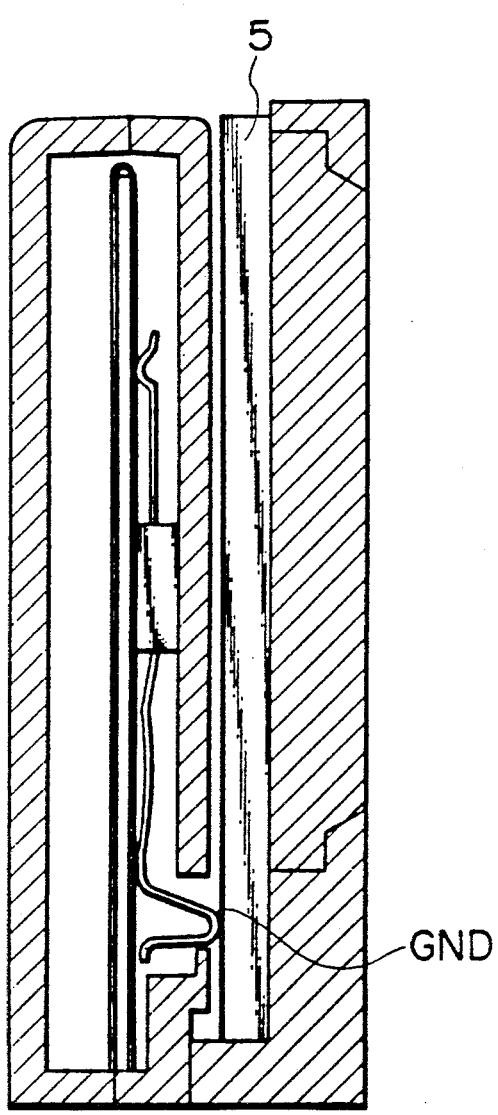
FIG. 4b is a sectional view corresponding to FIG. 4a with the IC card loaded into the camera.

As such insertion of the IC card into the camera proceeds, at first the paired terminals GND and NGND, RESET and NRESET, and $V_{DD1}$ and $NV_{DD1}$ are contacted with and electrically connected to each other, and then the paired terminals ECP and NCLK, CSBCK and NINT, SCK and NSCK, SOUT and NSIN, and SIN and NSOUT are contacted with and electrically connected to each other. Finally, the terminals NSR and NCM, which are disposed so that they may not be contacted with any terminal of the IC card 5, are contacted and operated by the IC card 5 to turn the switches SW1 and SW2 from an on-state to an off-state, respectively. Such contacting sequence of terminals is intended to attain such a condition that, before a reset condition of the IC card 5 is canceled, the camera side microcomputer μ-com1 starts its operation and can thus communicate with the IC card 5. FIGS. 4a and 4b shows contacting relationships between the individual paired terminals other than the switch terminals NSR and NCM before and after insertion of an IC card while FIGS. 5a and 5b shows contacting relationships of the switch terminals NSR and NCM with the IC card before and after insertion of the IC card. When the IC card 5 is loaded in position, the switches SW1 and SW2 shown in FIG. 1 are thus switched from an on-state to an off-state.

Figure 7:
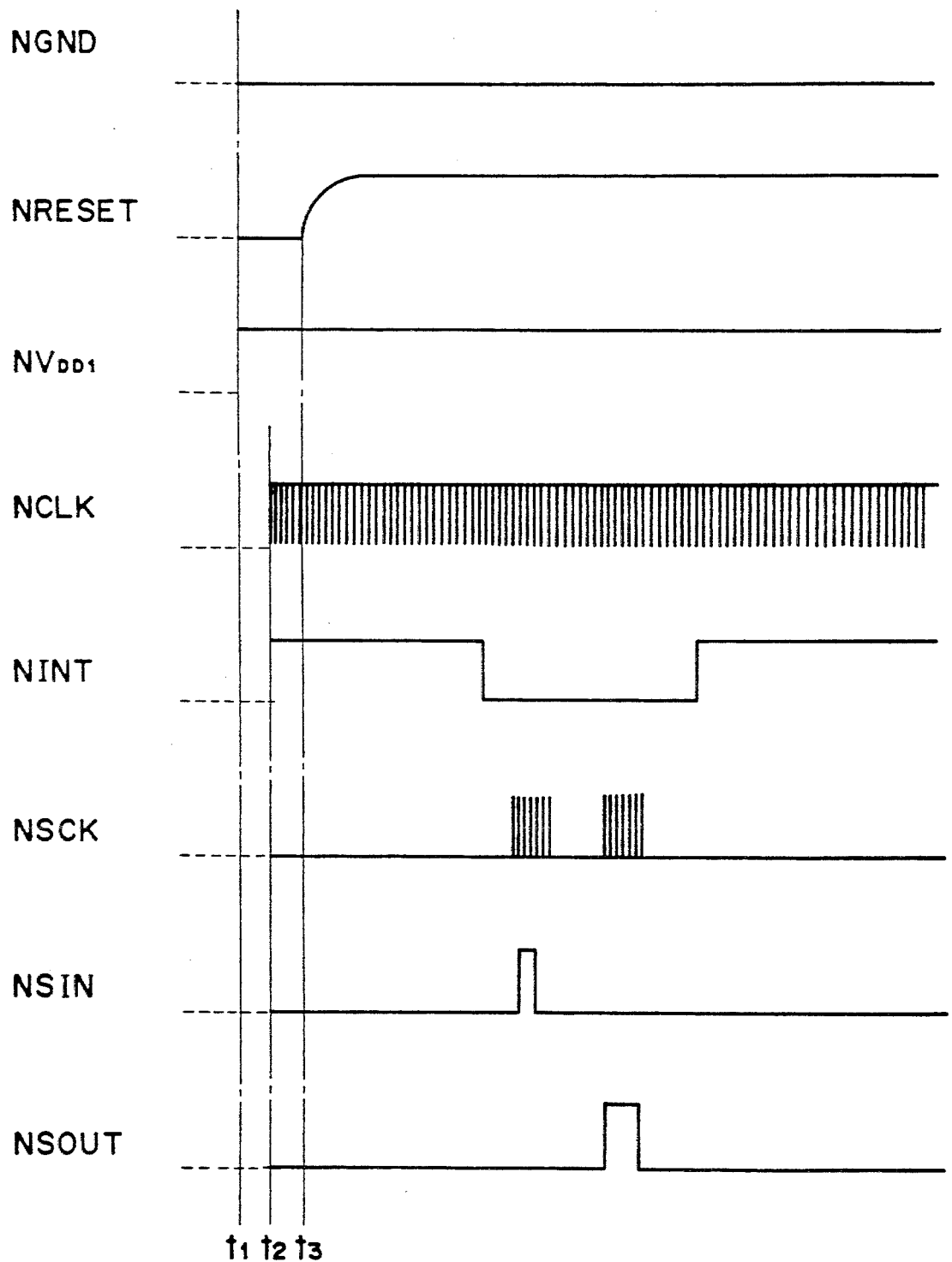

After the switch SW1 is turned off, a voltage applied to the port RESET gradually rises in accordance with a time constant here defined by a capacitor $C_2$ and a resistor $R_2$ built in the IC card 5. Then, when the voltage rises to a predetermined level, the reset condition of the IC card 5 is canceled. To the contrary, since the switch SW2 is turned off simultaneously with the switch SW1, the camera side microcomputer $\mu$-com1 is activated so that the higher power supply voltage $V_{DD1}$ is supplied from the DC/DC converter DC/DC. Output of the higher frequency oscillator B which operates with the voltage $V_{DD1}$ is divided by the camera side microcomputer $\mu$-com1 to produce system clocks which are delivered from the terminal ECP of the camera side microcomputer $\mu$-com1 to the card side microcomputer $\mu$-com2 by way of the terminal NCLK of the IC card 5. In response to reception of such system clocks by the card side microcomputer $\mu$-com2, the IC card 5 starts its operation. Signals at the terminals of the IC card 5 until the IC card 5 starts its communication with the camera after it has been loaded in position into the camera are shown in FIGS. 6 and 7. FIG. 6 shows such signals when the IC card 5 is loaded in position into the camera while the camera is in its stand-by condition, and in FIG. 6, each of the terminals of the IC card 5 is contacted with its paired terminal of the camera at a point of time when the signal waveform curve changes from a broken line indication to a solid line indication. To the contrary, FIG. 7 shows such signals when the IC card 5 is loaded while the camera is in its operative condition.

In particular, when an IC card 5 is inserted in position, the switch SW1 is turned off so that the potential at the terminal NRESET of the IC card 5 thereafter rises in accordance with a time constant defined by the capacitor $C_2$ and the resistor $R_2$. The camera side microcomputer $\mu$-com1 monitors the port SCDM thereof, and after it discriminates that the switch SW2 has been turned off, it starts its operation. After starting, the camera side microcomputer $\mu$-com1 is supplied with the higher power supply voltage $V_{DD1}$ from the DC/DC converter DC/DC and produces system clocks from an output of the higher frequency oscillator B. The system clocks thus produced are supplied to the terminal NCLK of the IC card 5. Consequently, the IC card 5 starts its operation and thus waits for communication with the camera circuit 6. The IC card in its operative condition normally monitors a signal to the terminal NINT thereof, and after the signal to the terminal NINT changes from a high voltage level to a low voltage level, the card side microcomputer $\mu$-com2 reads a data to the terminal NSIN of the IC card in response to a falling edge of each of serial clocks delivered to the terminal NSCK of the IC card from the camera side microcomputer $\mu$-com1. The card side microcomputer $\mu$-com2 discriminates the thus read data and delivers data corresponding to the data to the camera side microcomputer $\mu$-com1 in response to a subsequent falling edge of the serial clock by way of the terminal NSOUT of the IC card 5.

When no battery is loaded in position in the camera, the switch SW3 is in its on-state so that the port RESET of the camera side microcomputer $\mu$-com1 receives a low level voltage. Accordingly, the camera side microcomputer $\mu$-com1 remains in its reset condition. When the port RESET of the camera side microcomputer $\mu$-com1 is at its low level, the port PWC presents a low voltage level so that the DC/DC converter DC/DC can starts its operation at any time when a battery is loaded in position. Thus, if a battery is loaded, the DC/DC converter DC/DC starts its operation so that the higher power supply voltage $V_{DD1}$ is supplied to the camera side microcomputer $\mu$-com1. When the battery is inserted in position, the switch SW3 is turned off so that the voltage at the port RESET thereafter rises in accordance with a time constant defined by the resistor $R_1$ and the capacitor $C_1$. Consequently, the reset condition of the camera side microcomputer $\mu$-com1 is canceled finally, and the higher frequency oscillator B starts its operation. Then, the camera side microcomputer $\mu$-com1 counts clocks supplied from the higher frequency oscillator B for a predetermined period of time until the lower frequency oscillator A is stabilized. After completion of such counting, the camera side microcomputer $\mu$-com1 monitors current states of the switches with clocks from the low frequency oscillator A. Then, if either the switch SW2 has been turned off or any of the other switches including the switch S1 has been turned on, that is, if any switch for activation of the camera side microcomputer $\mu$-com1 has not yet been operated, the camera side microcomputer $\mu$-com1 delivers a signal from the port PWC thereof to the DC/DC converter DC/DC to stop operation of the DC/DC converter DC/DC, thereby entering a stand-by condition. On the contrary, in case any switch for activation has been operated, the camera side microcomputer $\mu$-com1 leaves the DC/DC converter DC/DC operative and thus continues its operation.

To the contrary, in case a battery is inserted in position into the camera while an IC card 5 remains loaded in position in the camera, the switch SW3 is turned off so that a reset signal which rises in accordance with a time constant defined by the resistor $R_1$ and the capacitor $C_1$ is inputted to the camera side microcomputer $\mu$-com1. Thus, the reset condition of the camera side microcomputer $\mu$-com1 is canceled at a point of time when the voltage at the port RESET of the camera side microcomputer $\mu$-com1 exceeds a predetermined level. Since the IC card 5 remains loaded in position in the camera then, the switch SW1 remains in an off-state. Then, the IC card 5 remains in its reset condition until the higher power supply voltage $V_{DD1}$ is supplied thereto from the DC/DC converter DC/DC by way of the diode $D_3$ after such canceling of the reset condition of the camera side microcomputer $\mu$-com1. After the higher power supply voltage $V_{DD1}$ is supplied, the voltage rises in accordance with a time constant defined by the resistor $R_2$ and the capacitor $C_2$, and when the voltage reaches a predetermined level, the reset condition of the IC card 5 is canceled.

In the connecting device described above, the terminals on the camera are disposed at different positions in the insertion direction of an IC card in order that they may be successively brought into contact at different timings with the terminals on the IC card. However, a similar effect may be attained by a different arrangement of terminals of an IC card and/or a camera as an electronic appliance. For example, a similar effect can be attained by such a terminal arrangement as shown in FIGS. 8 and 9.

Figure 8:
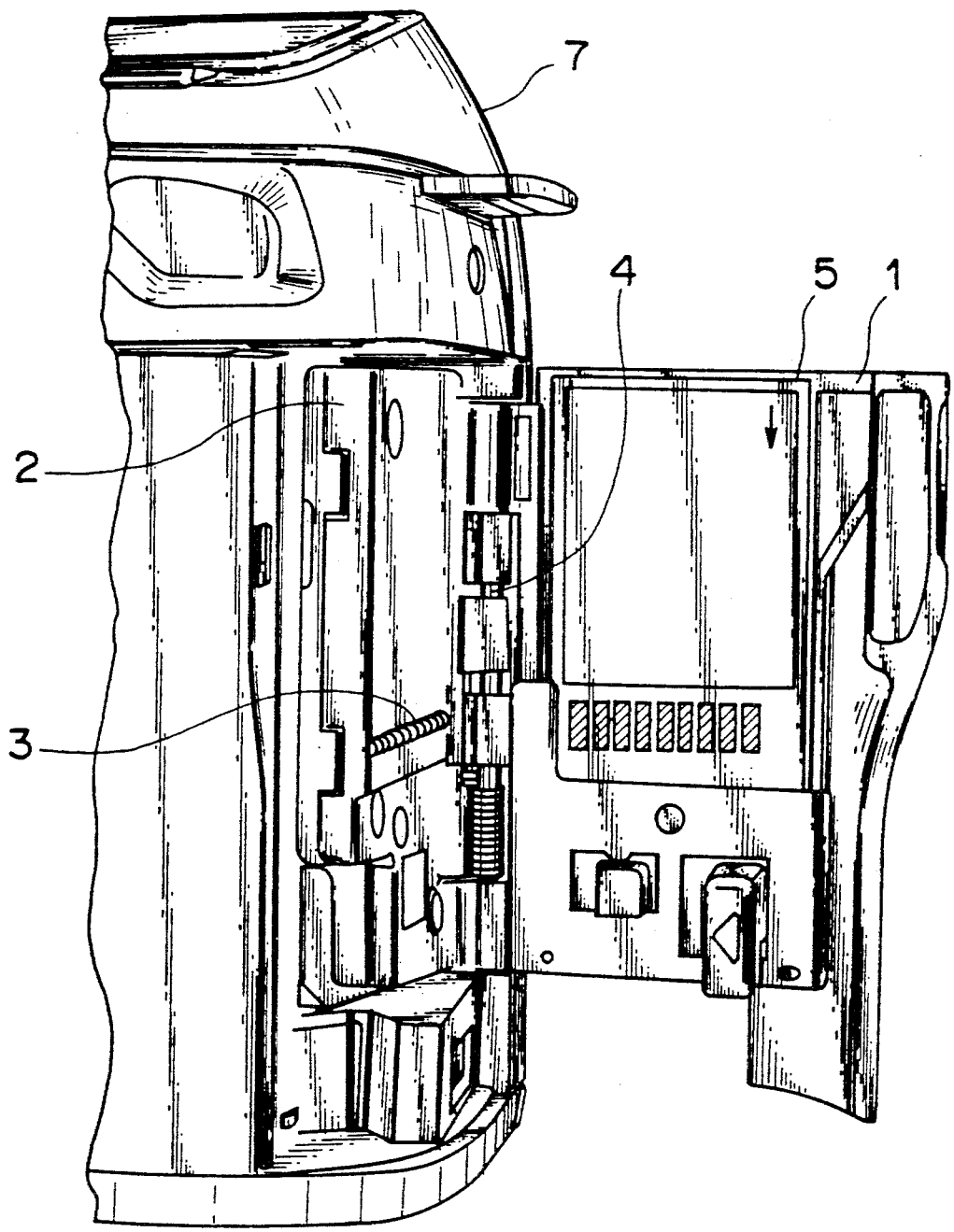
FIG. 8 is a partial perspective view of a camera showing a second preferred embodiment of the present invention.

Referring to FIG. 8, a body 7 of a camera shown includes an IC card accommodating device for accommodating therein an IC card such as the card 5 shown in FIG. 2. The IC card accommodating device includes a card holder unit (hereinafter referred to as outer lid) 1 having an IC card accommodating portion thereon, and a contact holder unit (hereinafter referred to as inner lid) 2 in which contact elements 3 for contacting with an IC card are accommodated. The outer lid 1 is mounted for pivotal motion on the camera body 7 by means of a hinge 4. When the outer lid 1 is pivoted in the clockwise direction in FIG. 8 around the hinge 4, contacts of an IC card 5 loaded in position are contacted with the contact elements 3 of the inner lid 2 to establish electric connection between them. It is to be noted that description of detailed construction of a mechanism for supporting the outer lid 1 for pivotal motion and retaining the same at its closed position is omitted herein because it has no particular relation to the connecting device of the present invention.

Figure 9:
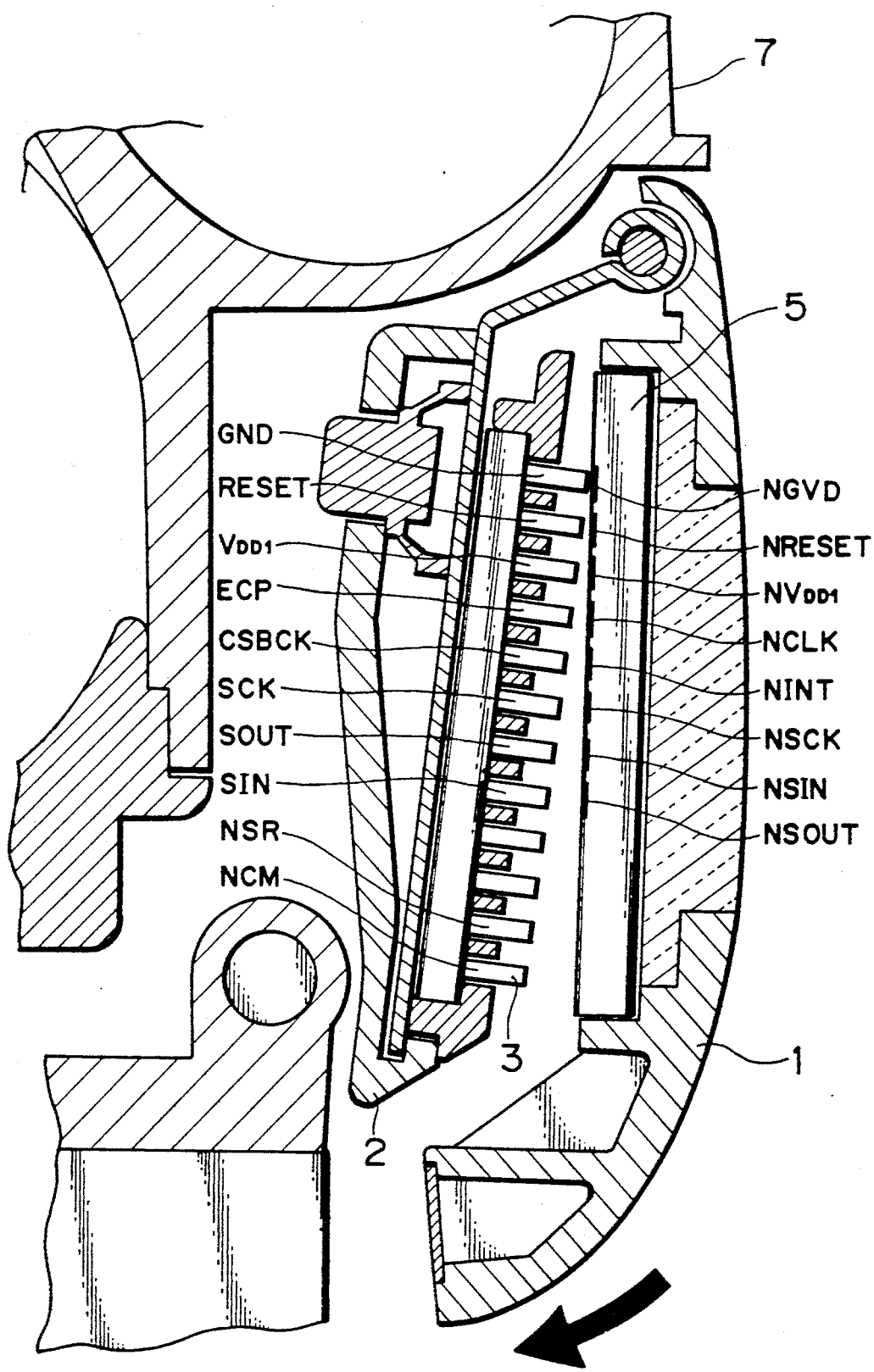
FIG. 9 is a horizontal sectional view illustrating a relationship between terminals of an IC card and terminals of the camera shown in FIG. 8.

FIG. 9 shows an IC card 5 being loaded in position into the outer lid 1 on the camera body 7. FIG. 9 is a horizontal sectional view at the terminals or contacts of the camera and the IC card 5 as viewed from above the camera body 7, and from FIG. 9, it can be apparently seen how the contacts 3 of the inner lid 2 are successively brought into contact with the terminals of the IC card 5. In particular, at first the paired terminals GND and NGND of the inner lid 2 and the IC card 5 are contacted with each other. Then, the paired terminals RESET and NRESET are contacted with each other. In this manner, the paired terminals of the inner lid 2 and the IC card 5 are successively brought into contact with each other in a predetermined order until the switch terminals NSR and NCM of the inner lid 2 are contacted by the IC card 5.

In summary, each of the connecting devices of the first and second embodiments of the present invention described above is constructed in the following manner and exhibits various effects described below.

In particular, when an IC card is loaded in position into the camera, at first the negative power source terminal, reset terminal and positive power source terminal among several terminals of the IC card are brought into contact with the corresponding terminals of the camera to reset the IC card. Consequently, such a trouble can be prevented that a component circuit of the IC card may suffer from latchup, operation in error or breakdown during supply of power after loading of the IC card.

If the microcomputers including accessories thereof are to be reset with a comparatively small number of parts upon loading of a battery into the camera, such resetting of the microcomputers may sometimes take place incompletely. However, with the connecting device described above, complete resetting of the microcomputers is assured with a comparatively small number of parts because it includes the first switch for resetting the camera side microcomputer in response to loading of a battery, the second switch for resetting the other microcomputer in the IC card in response to loading of the IC card, and the diode connected between the first and second switches in such a conducting direction that both of the microcomputers may be reset upon loading of a battery, but only the card side microcomputer may be reset upon loading of the IC card.

After loading of an IC card into the camera, communication of data is required between the camera side microcomputer and the IC card, and it is necessary to cause the camera side microcomputer in its stand-by condition to detect such loading of the IC card and start its operation quickly. With the connecting device described above, quick starting and data communication are enabled by such construction of the circuit that it includes the two switches for detecting loading of an IC card into the camera, and one of the switch is always monitored by the camera side microcomputer to allow detection of an IC card at any time while the circuit of the IC card is initialized by means of the other switch.

Having now fully described the invention, it will be apparent to one of ordinary skill in the art that many changes and modifications can be made thereto without departing from the spirit and scope of the invention as set forth herein.

What is claimed is:

1. A connecting device for establishing electric connection between an electronic appliance and an IC card loaded in position in said electronic appliance, comprising a positive power source terminal, a negative power source terminal, a signal terminal and a reset terminal all located on said IC card, another positive power source terminal, another negative power source terminal, another signal terminal and another reset terminal all located on said electronic appliance for connection with said positive power source terminal, negative power source terminal, signal terminal and reset terminal on said IC card, respectively, and first switch means located on said electronic appliance for producing, in response to loading of said IC card in position into said electronic appliance, a signal for canceling a reset condition of said IC card, said terminals of said IC card and said electronic appliance being arranged such that, when said IC card is loaded in position into said electronic appliance, at first said negative power source terminal, reset terminal and positive power source terminal of said IC card are brought into contact with the corresponding terminals of said electronic appliance, and then said signal terminal of said IC card is brought into contact with said signal terminal of said electronic appliance, whereafter said first switch means of said electronic appliance are contacted by said IC card.

2. A connecting device as claimed in claim 1, further comprising a second switch means for being contacted by said IC card simultaneously with said first switch means to produce a signal for activating said electronic appliance.

3. An arrangement of connecting terminals of a card which includes an integrated circuit device therein and is adapted to be loaded into an electric appliance, comprising:
    a ground terminal:
    a reset terminal for resetting said integrated circuit device;
    a power receiving terminal for receiving supply of power from said electric appliance;
    a first clock terminal for receiving clock pulses for operation of said integrated circuit device;
    a start signal receiving terminal for receiving a signal indicative of starting of communication of data;
    a second clock terminal for receiving clock pulses for communication of data;
    a data receiving terminal for receiving data from said electric appliance; and a data delivering terminal for delivering data to said electric appliance;

the above-listed terminals being arranged in a line.

4. A system including an electric appliance and a card which has an integrated circuit device therein, comprising:

a power supply means provided on said electric appliance;

a controlling circuit provided on said electric appliance for controlling operation of said electric appliance;

a reset circuit provided on said electric appliance for resetting said controlling circuit, said reset circuit including a resistor having an end connected to said power supply means and a capacitor having an end connected to said resistor and the other end grounded;

a first switch means provided on said electric appliance and connected in parallel to said capacitor for canceling a reset condition of said controlling circuit in response to loading of a battery into said electric appliance;

a diode provided on said electric appliance and having the cathode connected to a junction between said resistor and said capacitor;

a second capacitor provided on said electric appliance and having an end connected to the anode of said diode and the other end grounded;

a second switch means provided on said electric appliance and having an end grounded, said second switch means being turned off in response to loading of said card in position into said electric appliance;

a first reset terminal provided on said electric appliance and connected to the other end of said second switch means and also to the anode of said diode;

a power supply terminal provided on said electric appliance and connected to said power supply means;

a first ground terminal provided on said electric appliance and connected to the ground;

a second ground terminal provided on said card for connection with said first ground terminal and connected to said integrated circuit device and also to the ground;

a second reset terminal provided on said card for connection with said first reset terminal and connected to said integrated circuit device;

a power receiving terminal provided on said card for connection with said power supply terminal and connected to said integrated circuit device; and a second resistor provided on said card and connected to said second reset terminal and said power receiving terminal.

5. A card for use with an electric appliance which includes a power supply means, a controlling circuit for controlling operation of said electric appliance, a reset circuit for resetting said controlling circuit, said reset circuit including a resistor having an end connected to said power supply means and a capacitor having an end connected to said resistor and the other end grounded, a first switch means connected in parallel to said capacitor for canceling a reset condition of said controlling circuit in response to loading of a battery in position into said electric appliance, a diode having the cathode connected to a junction between said resistor and said capacitor, a second capacitor having an end connected to the anode of said diode and the other end grounded, a second switch means having an end grounded and so positioned as to be turned off in response to loading of said card in position into said electric appliance, a reset terminal connected to the other end of said second switch means and also to the anode of said diode, a power supply terminal connected to said power supply means, and a ground terminal connected to the ground, said card comprising:

an integrated circuit device;

a ground terminal connected to said integrated circuit device and the ground and located for connection with said ground terminal of said electric appliance;

a reset terminal connected to said integrated circuit device and located for connection with to said reset terminal of said electric appliance;

a power receiving terminal connected to said integrated circuit device and located for connection with said power supply terminal of said electric appliance; and a second resistor connected to said reset terminal and said power receiving terminal.

* * * * *